(12) United States Patent
Horton et al.

(10) Patent No.: US 6,421,622 B1
(45) Date of Patent: Jul. 16, 2002

(54) DYNAMIC ATTITUDE MEASUREMENT SENSOR AND METHOD

(75) Inventors: Michael A. Horton, Los Gatos; Jose A. Rios, Oakland; Jin Song, Saratoga, all of CA (US)

(73) Assignee: Crossbow Technology, Inc., San Jose, CA (US)

( * ) Notice: Subject to any disclaimer, the term of this patent is extended or adjusted under 35 U.S.C. 154(b) by 0 days.

(21) Appl. No.: 09/326,738

(22) Filed: Jun. 4, 1999

Related U.S. Application Data (60) Provisional application No. 60/088,160, filed on Jun. 5, 1998.

(51) Int. Cl.⁷ .............................. G01P 21/00; G05D 1/00
(52) U.S. Cl. .......................... 702/95; 702/151; 702/155; 701/11; 701/220
(58) Field of Search .................................. 702/151, 155, 702/141, 142, 95; 701/213, 214, 220, 11, 4; 342/95

(56) References Cited

U.S. PATENT DOCUMENTS

| | | | | |
|---|---|---|---|---|
| 4,318,300 A | * | 3/1982 | Maughmer | 73/178 R |
| 4,399,692 A | | 8/1983 | Hulsing, II et al. | 73/151 |
| 4,454,756 A | | 6/1984 | Sharp et al. | 73/151 |
| 4,827,624 A | | 5/1989 | Franklin et al. | 33/366 |
| 4,914,598 A | * | 4/1990 | Krogmann et al. | 701/11 |
| 5,031,330 A | | 7/1991 | Stuart | 33/366 |
| 5,148,604 A | | 9/1992 | Bantien | 33/366 |
| 5,172,323 A | * | 12/1992 | Schmidt | 701/220 |
| 5,210,954 A | | 5/1993 | Schafler | 33/366 |
| 5,237,753 A | | 8/1993 | Carlson et al. | 33/366 |
| 5,241,850 A | | 9/1993 | Kawate | 73/1 D |
| 5,287,628 A | | 2/1994 | Yamaguchi et al. | 33/361 |
| 5,335,190 A | | 8/1994 | Nagle et al. | 364/571.01 |
| 5,351,539 A | | 10/1994 | Ziegenbein et al. | 73/500 |
| 5,381,604 A | | 1/1995 | Heidel et al. | 33/366 |
| 5,392,112 A | | 2/1995 | Nakamura | 356/139.1 |
| 5,400,033 A | * | 3/1995 | Hablani | 342/95 |
| 6,061,611 A | * | 5/2000 | Whitmore | 701/4 |
| 6,205,401 B1 | * | 3/2001 | Pickhard et al. | 701/220 |

OTHER PUBLICATIONS

L. Moskowitz, "Part I: Measurement of Applied Acceleration—Accelerometer Calibration," *Instruments & Control Systems*, Feb. 1961, pp. 257–260.

ADXL5O/ADXL05 Evaluation Modules, Analog Devices, Inc., 1996.

* cited by examiner

*Primary Examiner*—Arthur T. Grimley
*Assistant Examiner*—Mohamed Charioui
(74) *Attorney, Agent, or Firm*—Fenwick & West LLP

(57) ABSTRACT

A method and system senses the attitude of an accelerating object. Attitude sensing is accomplished by measuring acceleration in three orthogonal axes and measuring angular rate about each such axis to compute attitude accurately relative to a vertical axis. The system includes accelerometers and angular rate sensors for sensing the acceleration and the angular rate, respectively, of the object. A processor updates a quarternion representation of attitude based upon the angular rate of the object and a corrective rate signal to obtain the attitude of the object. Temperature compensation and frequency compensation may also be performed to update the quarternion.

17 Claims, 5 Drawing Sheets

$f_B$ = compensated Bandwidth

DYNAMIC ATTITUDE MEASUREMENT SENSOR AND METHOD

CROSS-REFERENCE TO RELATED APPLICATION

This application claims priority to U.S. Provisional Application No. 60/088,160, filed on Jun. 5, 1998, by Michael A. Horton, entitled "DYNAMIC ATTITUDE MEASUREMENT SENSOR AND METHOD" which is fully incorporated herein by reference.

FIELD OF THE INVENTION

This invention relates to the measurement of attitude of accelerating bodies, and more particularly to attitude sensors and control systems.

BACKGROUND OF THE INVENTION

Certain known techniques for measuring and controlling attitude of a moving body commonly rely upon a gyroscope spinning about a vertical axis, or upon a liquid sensor, or upon a pendulum device responsive to downward gravitational orientation. However, the mass of a pendulum renders such devices also responsive to acceleration, and hence are not useful as attitude sensors in dynamic systems involving an accelerating body. Similarly, liquid sensors exhibit mass that affects attitude detection during acceleration, and also such sensors are vulnerable to vibration that affects surface characteristics of the liquid upon which sensing may depend.

Vertically-oriented spinning gyroscopes commonly operate as attitude sensors, but are usually heavy, bulky, expensive devices that are subject to precession and drift errors. They also suffer from poor reliability in rugged operating environments due to the moving parts that make up the technology which require periodic maintenance to keep the units operational.

Other known attitude sensors rely upon multiple GPS receivers at spaced locations to compute attitude from signals received at each location. However, such computation of attitude is subject to the distance inaccuracy of signals received at each location, and the spacing of the locations should be very much larger than the distance error associated with each such location, and this contributes to unacceptably large systems for making fine attitude measurements. Rate sensors of negligible mass such as ring laser gyroscopes have been used in attitude-sensing measurements, but are vulnerable to drift and associated long-term instability.

SUMMARY OF THE INVENTION

In accordance with the present invention, accurate attitude sensing is accomplished by measuring acceleration in three orthogonal axes and measuring angular rate about each such axis to compute attitude accurately relative to a vertical axis. Solid-state accelerometers and rate sensors are temperature compensated and are assembled into a small common housing for applications in rugged environments. Measurement errors attributable to fabrication misalignments, and the like, are calibrated out following initial assembly for highly reliable and accurate outputs from a compact, rugged assembly of components. Vibrating ceramic plates operate as rate sensors responsive to Coriolis forces to produce angular rate outputs independently of acceleration, and micromachined silicon devices operating as differential capacitors to sense acceleration in aligned directions independently of angular rate about the orthogonal axes.

A method in accordance with the present invention includes converting analog outputs of all sensors to digital values with stored calibration correction values. The signals representing total angular rate or rotational velocity about each of the orthogonal axes is integrated into a quarternion (i.e., a 4-element vector that completely describes the orientation of an object), and total angular rate is computed from the sensed and corrected rates. The direction cosines are computed from the quarternion, and the accelerations of the assembly are computed from the three acceleration signals multiplied by the direction cosines. Attitude and other parameters or orientation and motion of the assembly are derived from the data produced by the accelerometers and rate sensors within the common assembly.

The present invention provides a relatively inexpensive and compact-sized system that generates an accurate representation of an attitude of an object. In particular, the system can measure attitude for an object that may be accelerating, thereby overcoming the drawbacks of conventional attitude measuring devices mentioned above. Furthermore, the present invention provides a self-tuning system that automatically compensates for drift and that automatically updates the quarternion obtained from sensor outputs. The system can generate highly accurate output data based upon measurements obtained from commercially available, low or mid-level performance sensors. In addition, the user of the system can provide input commands that can adjust the output data of the system in order to further compensate for factors in the environment of the system. The present invention also reduces the manufacturing complexity of attitude measurement devices by providing a calibration sequence that reduces the number of testing steps during the manufacturing process.

DETAILED DESCRIPTION OF THE INVENTION

Figure 1:
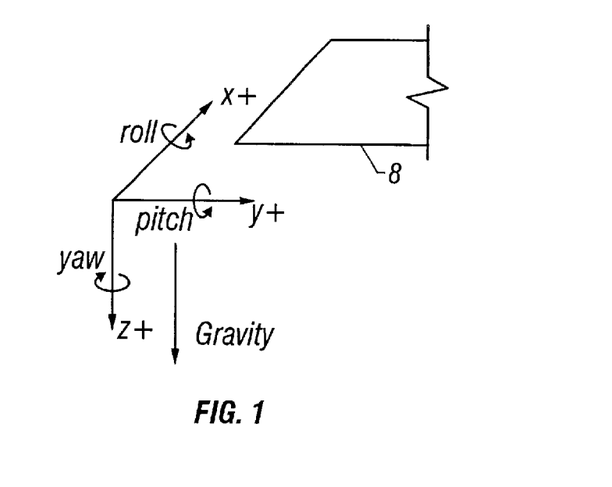
FIG. 1 is a graph illustrating coordinate axes with respect to which the present invention responds to movements and orientations.

Referring now to the graph of FIG. 1, there is shown a coordinate set of axes X, Y, and Z that designate directions of movement or orientations with respect to the 'horizon' 8 as a reference plane, and about which rotational motions are specifically legend as 'pitch' (i.e., rotation about Y in the XZ plane), and 'roll' (i.e., rotation about X in the YZ plane), and 'yaw' (i.e., rotation about Z in the X Y plane, also referenced as 'heading' or 'azimuth').

Figure 2:
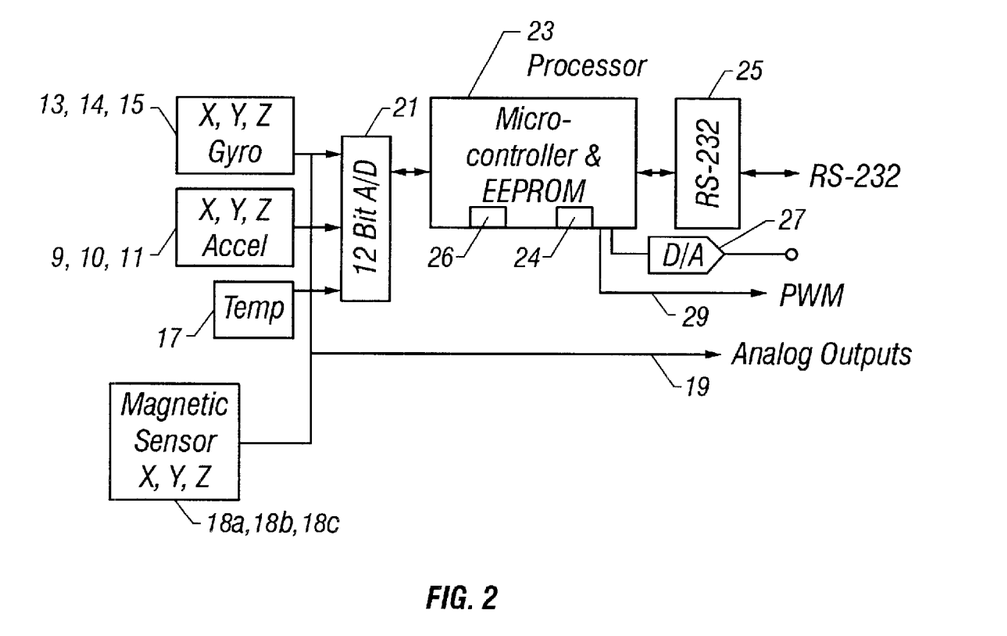
FIG. 2 is a block schematic diagram of one embodiment of the present invention.

In accordance with the present invention, as illustrated in the block diagram of FIG. 2, solid-state accelerometers 9, 10, 11 are disposed in alignment with each of the X, Y, and Z axes, respectively, and inertial elements 13, 14, 15 are disposed to sense rate of change of angular displacement about each of the X, Y, and Z axes, respectively. The accelerometers 9–11 may each comprise conventional micro-machined silicon devices that operate on differential capacitance to produce an analog output indication of axial acceleration. Suitable devices are commercially available as Model No. ADXOL5 from Analog Devices, Inc. of Norwood, Massachusetts. Similarly, the inertial elements 13–15 are solid-state devices that each comprises a vibrating ceramic plate responsive to Coriolis force to produce an analog output indication of angular rate independent of acceleration. Suitable devices are commercially available as Model No. ENV-05H-2 from Murata Manufacturing Co., Ltd. in Japan. The accelerometers and rate sensors and a temperature sensor 17 may be assembled within a confining housing of about 3 cubic inches, or less, for unobtrusive installation in numerous applications. Optional magnetic sensors 18a–18c may be aligned with each of the X, Y, and Z axes in order to provide correction factors for heading (yaw), as described below. The analog outputs from the accelerometers 9–11, and from the inertial elements 13–15, and from the temperature-sensing element 17, and from magnetic sensors 18a–18c, are supplied as outputs 19 of the assembly, and are also supplied to an on-board Analog-to-Digital (A/D) converter 21 for conversion in time-share mode to digital data with a minimum 12-bit accuracy with respect to the applied analog input signals. The digitized data is supplied to an on-board processor 23 having Electrically Erasable Programmable Read-Only Memory (EEPROM) 24 with storage locations therein for storing the calibration data for the sensors, as later described herein. The processor 23 also includes a frequency compensation network 26 for further manipulating the sensor outputs, as described below. One suitable processor 23 is the DSP processor Model TMS 320C50 available from Texas Instruments, Inc. of Dallas, Tex.

The on-board processor 23 may be controlled to perform various calibration and operational routines via the conventional RS-232 controller port 25. The processor 23 may supply output data via a Digital-to-Analog (D/A) converter 27 for analog outputs per sensor in time-shared mode, or may provide output data per sensor as pulse-width modulated (PWM) output signal 29 in time-shared mode.

Figure 3:
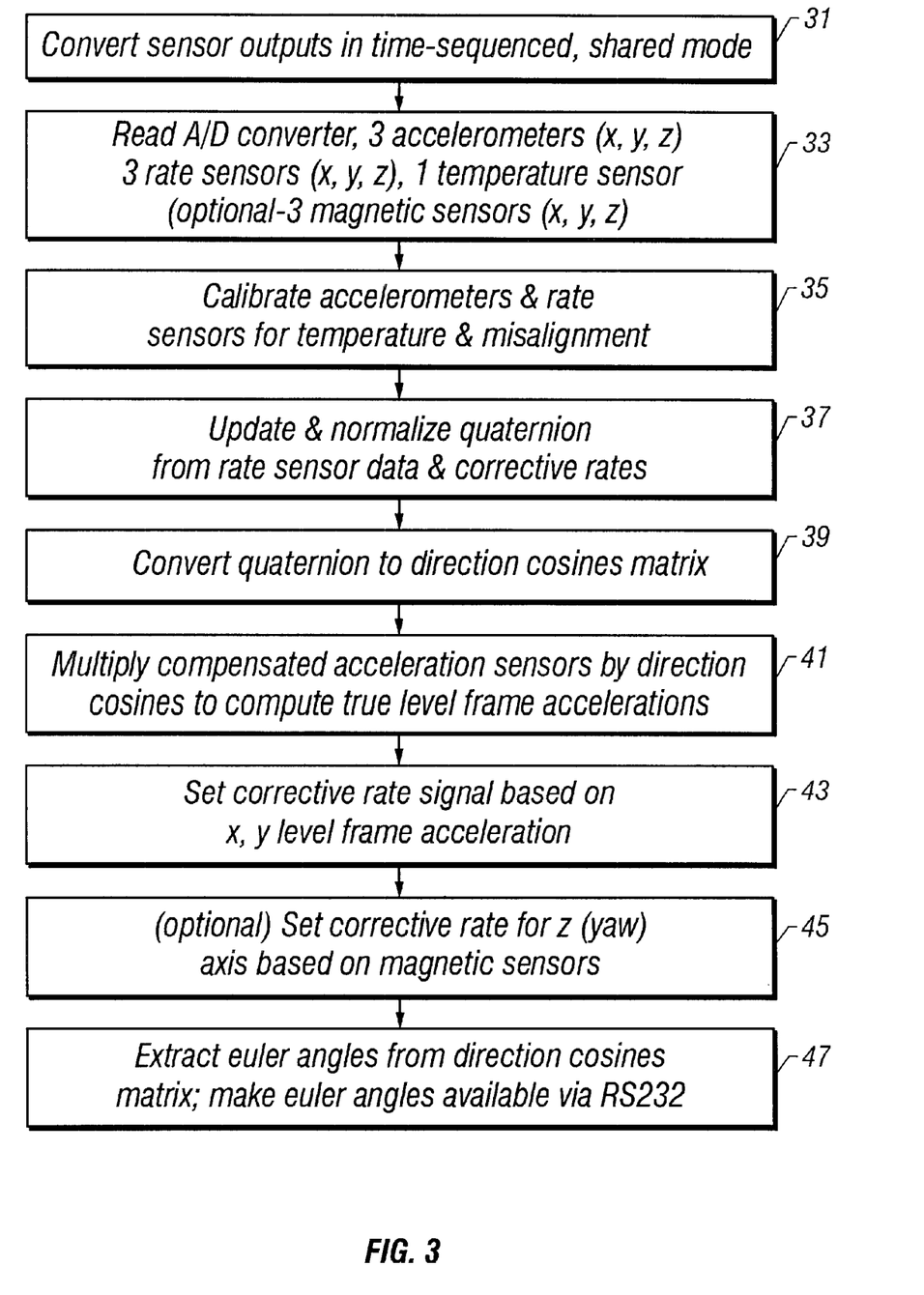
FIG. 3 is a flow chart of an operational sequence according to the present invention.
Figure 6:
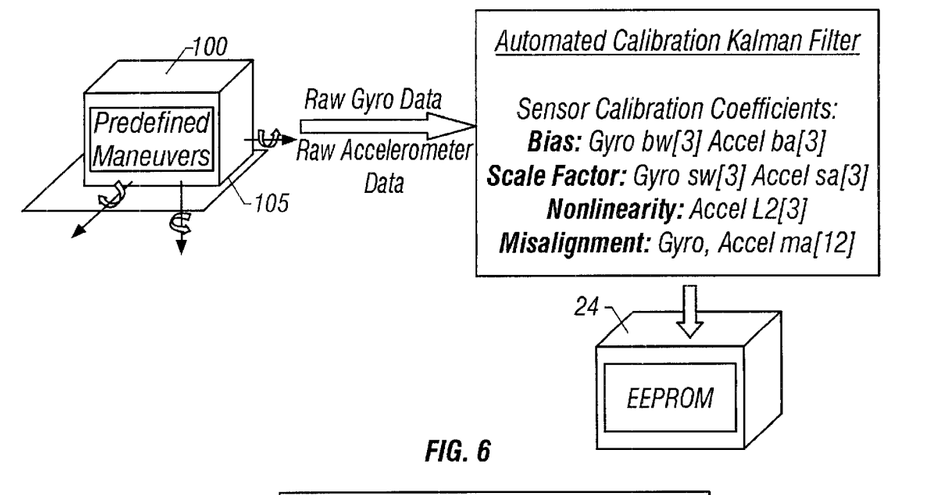
FIG. 6 is a flowchart describing a method for determining the calibration coefficients and correction factors thereby providing a "factory calibration" used in accordance with the present invention.

As illustrated in the flow chart of FIG. 3, data from all of the sensors 9–11, 13–15, and 17 (and 18a–18c, optionally) (FIG. 2) in one processing cycle are converted 31 in time-sequenced, shared mode by A/D converter 21 for storage in selected memory locations of the EEPROM 24. This digital data is converted 33 by the processor 23 to the sensed variables of accelerations and angular rates of the sensors within the assembly relative to the respective X, Y, and Z axes. This step is done using the calibration data stored in the EEPROM via application of the Sensor Compensation formulas, as set forth in Appendix A. Appendix A to Appendix G are provided below. A method of determining the proper calibration data (coefficients) in the Sensor Compensation formulas is described in detail below with reference to FIG. 6. An implementing program in 'C' or assembly language may be prepared in conventional manner to control a processor 23 that can execute solutions to the Sensor Compensation formulas at 100 $H_z$ or faster rates. A DSP processor Model TMS320C206 available from Texas Instruments and operating on program code written in 'C' is suitable for the purpose. As stated above, optional magnetic sensors aligned with each of the X, Y, and Z axes may also be used to stabilize heading or yaw in addition to roll and pitch. The acceleration and rate sensors may then be calibrated 35 using calculations of the calibration coefficients, as detailed later herein. FIG. 6 below illustrates a method of performing the initial or "factory" calibration for the attitude measurement sensor in accordance with the present invention.

The angular rate signals are then integrated into a quaternion representation of attitude. The quaternion update formulas, and normalization of the quaternion, detailed in Appendix C, are further discussed below with reference to FIG. 7. The quaternion update 37 is the preferred method of attitude update because of the simplicity of the formulas and the small number (four) of variables that must be computed. Note that the integration is a function of not only the sensed angular rate but also the corrective angular rate as defined by ωcx, ωcy, ωcz. The generation of the corrective angular rate terms are described below in the text that follows. The incorporation of corrective angular rates prevents long term drift and instability that would be caused by the use of rate sensors alone. After the quaternion is computed, it is normalized to have a magnitude of one (1).

Once the quaternion has been updated to reflect the instantaneous orientation of the platform or object, the quaternion is converted 39 to a Direction Cosine Matrix in preparation for computing the corrective rate signals ωcx, ωcy, ωcz. The formulas for the Direction Cosine Matrix are set forth in Appendix D. A Direction Cosine Matrix (like the quaternion) also completely characterizes the attitude orientation of a body. The Direction Cosine Matrix, also referred to as a rotation matrix, is in fact a representation of the three rotations about the defined three axis (X,Y, and Z) needed to rotate a body from a level (to gravity) orientation, to the final orientation desired. Hence the relationships in Appendix D describe how the elements of the quaternion, which also describes said orientation, can be converted to the nine terms needed to define the Direction Cosine Matrix. The variables in Appendix D then include the definition of the Direction Cosine Matrix itself in the form of a 3 by 3 matrix (nine terms) dc[3][3], and the conversion of the four quaternion elements a,b,c and d into the Direction Cosine Matrix.

The Direction Cosine matrix is used to convert the acceleration vector of the platform or object into level frame readings that indicate 41 the true acceleration of the platform without tilt, as set forth in Appendix B. If, while the unit is sitting statically, there is a sensed level frame acceleration, one of two things has occurred. The solution for the attitude of the platform or object has drifted due to rate sensor drift, or the platform is moving linearly and accelerating in level frame coordinates.

Figure 5A:
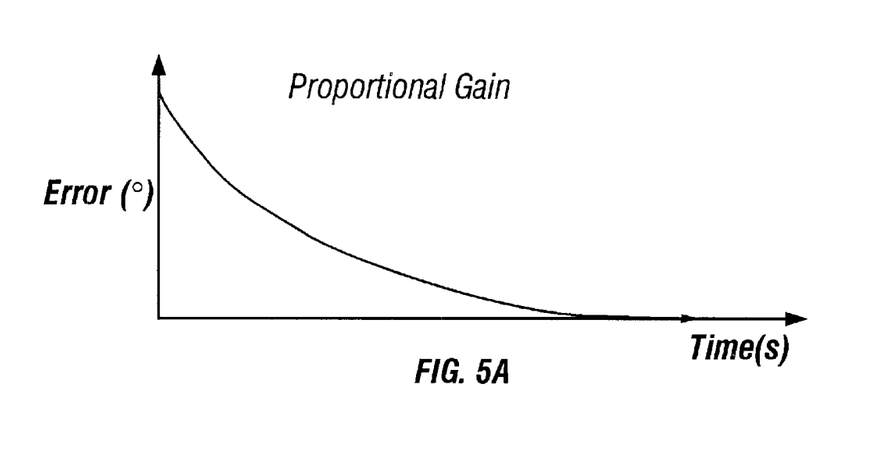
FIG. 5A is a graph illustrating error correction over time under proportional gain control.
Figure 5B:
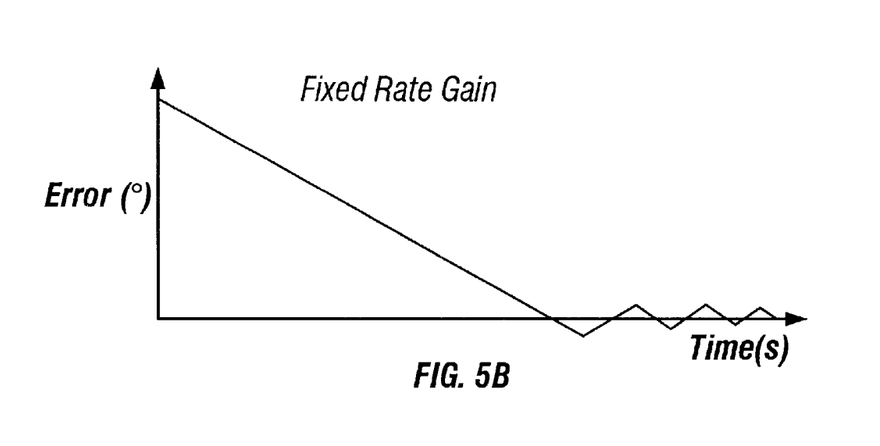
FIG. 5B is a graph illustrating error correction over time under fixed rate gain control according to the present invention.

The level frame accelerations are used to generate a corrective rate signal 43. There are several different methods of generating corrective rate signals, including Kalman or other conventional adaptive filtering, fixed gain scheduling, or non-linear gain scheduling. The Kalman filter/adaptive approach is optimal but involves extreme complexity (and leads to a relatively larger-sized and more expensive device). The proportional gain scheduling and non-linear gain (fixed-rate gain) scheduling are efficient and accurate enough for most scenarios, as detailed in Appendix E. For a setting of proportional gain, the corrective rate signals ωcx is obtained by multiplication of the level frame acceleration variable alev[2] (obtained during factory calibration) with the variable KG. The KG value can be considered a gain representing the magnitude of the correction, is user selectable and is described below. For a setting of non-linear, or fixed-rate gain, the corrective rate signals cocx is obtained by multiplication of the factor (−1) with the variable UG for alev[2]>0.0. The UG value can be considered a gain representing the magnitude of the fixed-rate correction, is also user selectable and is described below. Additionally, FIG. 5A shows the plot of error correction for proportional gain schedule and FIG. 5B shows the plot of error correction for non-linear gain schedule.

As a further option, the gain amount for the correction factors may also be adjusted by the user of the system of the present invention. This option permits the user to modify the system output for various reasons such as factors in the environment of the system, noise limitations, stability criteria, and the like. An example for making gain correction user selectable is to allow for the possibility of providing useful data during a rapidly maneuvering mission. There is a tradeoff between how much error in the gyros the algorithm can overcome with a low gain correction, compared to the errors induced from having a high gain correction while experiencing large maneuvering accelerations. If the user has knowledge of the intensity of upcoming maneuvers or complete control of the flight profile, then an adapted gain correction scheme can be developed by minimizing the gain correction during the high acceleration portions, and increasing the gain correction when not accelerating.

As further shown in FIG. 3, a corrective rate for the Z (yaw) axis acceleration may be generated 45 based upon the measurements of the magnetic sensors 18a–18c (FIG. 2). Regarding gyroscopic errors attributable to heading or directional deviations, a GPS receiver can be used to measure heading of a platform that is moving and that supports the assembly of sensors 9–11, 13–15, and 17. Another way to measure heading is to use magnetic sensors to measure Earth's magnetic field in the same assembly of the rate sensors and accelerometers. The heading thus measured can optionally be used to stabilize the yaw axis from drift. This capability yields a directional gyro measurement without any additional cost. The formulas for stabilizing heading are detailed in Appendix F.

Although the attitude solution is computed and stored internally as a quarternion and direction cosines matrix, it is most conveniently transmitted in Euler Angle format which is chosen because of its small size (3 variables versus 4 for quarternion and 9 for direction cosines matrix) and because it is interpreted as a 'real' angle about an axis. The Euler Angles are extracted 47 from the direction cosines matrix, as detailed in Appendix G, and are supplied via the interface 25 to the RS 232 bus.

Thereafter, temperature corrections, and other corrections, can be digitally incorporated into the output data using look-up tables in conventional manner. Specifically, for temperature calibration, the entire assembly may be operated at selected elevated temperatures to store acceleration and angular rate data at storage locations indexed by temperature values, and such data with associated corrections for temperature may thereafter be accessed from storage locations identified by the sensed operating temperature.

Similarly, look-up table corrections may also be prepared for operation in particular applications such as conventional camera stabilization platforms in which directional misalignments and non-linearities may be prepared in a look-up table indexed, for example, by angular orientations.

One-time factory calibration of the entire assembly of accelerometers and angular rate sensors and temperature sensor is typically required to correct for non-linearities of response, misalignments relative to the coordinate axes, and the like. Specifically, conventional accelerometers commonly produce an output linearly proportional to the input acceleration, with an offset value. Thus:

$$\text{Voltage out}=\text{Scale Factor}*\text{Acceleration}+\text{Offset} \qquad (\text{Eq. 1})$$

For calibration, known accelerations are applied in axial alignment in order to compute the scale factor and the offset from the resulting output voltages. Gravity along the Z axis provides a convenient reference, but since minor variations occur in gravity, it is important to determine gravity at the site of the calibration, and this can be accomplished very precisely by referencing standard formulas and handbooks that contain the exact gravitational constant for every longitude and latitude on Earth. A level surface on X-Y plane provides a convenient reference of zero (0) acceleration, thereby allowing determination of the offset voltage (also known as "bias").

Similarly, conventional angular rate sensors commonly produce an output voltage that is linearly proportional to the input angular rate, plus an offset. Thus:

$$\text{Voltage out}=\text{Scale Factor}*\text{Angular Rate}+\text{Offset} \qquad (\text{Eq. 2})$$

To calibrate such angular rate sensor, the sensor offset may be measured as an output voltage while the sensor is not moving (neglecting Earth's rotation as not significantly affecting the offset results). However, measuring scale factor traditionally requires an elaborate rotational table to subject the assembly to fixed angular rate for producing a resultant output voltage. Alternatively, in accordance with the present invention, from Equation 2, above:

$$V \text{ out}-\text{Offset}=\text{Scale Factor}*\text{Rate} \qquad (\text{Eq. 3})$$

$$\int(V \text{ out}-\text{Offset})dt=\text{Scale Factor}*\int(\text{Rate})dt \qquad (\text{Eq. 4})$$

$$\int(V \text{ out}-\text{Offset})dt=\text{Scale Factor}*\text{Angle} \qquad (\text{Eq. 5})$$

Equations 3 and 4 above describe algebraic and linear mathematical operations on Equation 2, namely the subtracting of both sides of Equation 2 by the offset, and then performing the integration operator on both sides of Equation 4. Equation 5 then defines the notion that the integral of the angular rate is in fact the angle. Since all variables of Equation 5 are determined except for scale factor, this parameter of a sensor can therefore be conveniently determined and used in the processing to solve for angular rate, given a sensor voltage, as detailed in Appendix A.

Regarding accelerometer alignment errors, these errors represent cross coupling between the axes of sensitivity attributable to misalignment of an accelerometer with the associated coordinate axis of responsiveness. Of course, if each accelerometer can be precisely aligned with its associated coordinate axis, then misalignment error is eliminated. However, machining tolerances and fabrication anomalies contribute to unpredictable misalignment errors, and accordingly, cross axis calibration following assembly is employed to improve accuracy of acceleration responses. Specifically, the assembly of sensors is placed on each of its three axes and an output is recorded. The value of the output is subtracted from the true input acceleration which will be zero on two axes and 1G on the axis exposed to gravitational field. The resulting data is organized into a matrix of 9 elements. This matrix is inverted in conventional manner and the result is a compensation matrix which converts measurements that have cross-axis sensitivities to true accelerations.

FIG. 6 illustrates a method of obtaining and setting the correction factors described above. The procedure for obtaining the correction factors will hereafter be referred to as "the calibration procedure." The calibration procedure is designed to adaptively estimate the correction factors for the six sensors in question. Optional magnetometer calibration is generated by taking measurements in a Helmhotz Coil. Calibrating a complicated six axis system is a difficult prospect when considering the amount of errors that are inherently part of the measurement technology employed by the accelerometers and gyros. The difficulty lies in the fact that to estimate the error factors in any calibration technique requires understanding the underlying properties of each error to generate data that reflects the error specifically, and seldom are the errors uncoupled enough to isolate each separate error source with much confidence. The procedure developed provides a technique which estimates all the error parameters at once from a single set of data, and generates the proper compensation for each error source. The technique employs an adaptive filtering scheme, a Kalman Filter, which processes a set of accelerometer and gyro readings from a predefined set of maneuvers. In essence, the calibration involves obtaining data from the sensors as the system 100 is placed on a leveled table 105, rotated about each axis and laid down on each face of the cube enclosing the system 100, and then processing the data with the Kalman Filter software which generates the compensation tables. As a final step the calibration compensation parameters are loaded into the EEPROM 24, from which the DSP 23 (FIG. 2) is able to obtain the parameters to apply the compensation to the raw accelerometer and gyro measurements to achieve calibrated data. The Kalman filter is a tried and true method of using a computer processor to estimate a set of parameters from a set of measurement data. The measurement data can be a direct measurement of the parameter, also known as a state, or a measurement of a signal that in some way has a mathematical relationship to the state the filter is trying to estimate. The filter structure is made up of two separate components, a state model and a measurement model. The state model is a detailed mathematical representation of the states, which is used to simulate their behavior and obtain a prediction of what values the states will have at some time in the future. The measurement model derives a correction to the predicted state based on the measurement data, and it is this corrected prediction of the state that is referred to as the final state estimate. In the calibration procedure Kalman Filter, the states that are estimated are the sensor correction factors or calibration parameters. A complex mathematical model of the behavior of the parameters and their interdependence makes up the state model. It uses the accelerometer and gyro data from the maneuvers to help in the prediction of the behavior of the parameters. The filter then infers from the maneuvers themselves information that it uses as a measurement of the parameters. For instance, the filter can determine when it has arrived at a stationary point in a maneuver, and therefore assumes that accelerometers should measure zero with one (1) along the gravity axis, and that the gyros should also measure zero. This information is processed by the measurement model, which deems any gyro data or gravity axis offset at this point as a measurement of the parameters, and forms a correction for the predicted parameters from the state model. A list of the parameters currently estimated by the filter is represented in the Table 1 below. Each parameter is weighted for its impact on the overall performance of the filter. The marks shown below depict those parameters deemed important for the represented sensor.

TABLE 1

|  | Gyros | Accelerometers |
|---|---|---|
| Bias | X | X |
| Scale Factor | X | X |
| Squared Non-Linearity |  | X |
| Misalignment | X | X |

Figure 7:
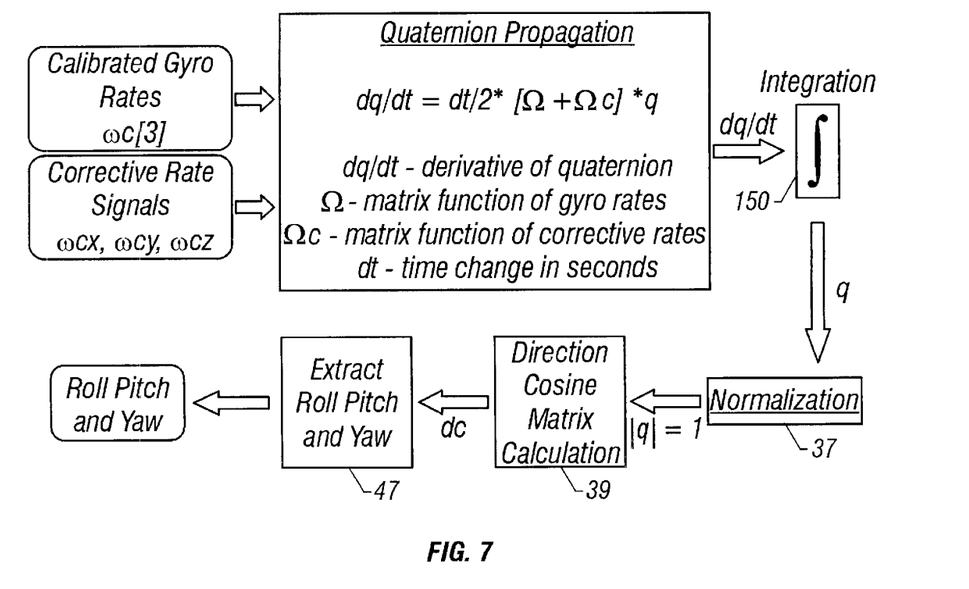
FIG. 7 is a flowchart illustrating additional details of the quarternion update and normalization.

FIG. 7 illustrates a method of updating and normalizing a quaternion that is obtained from the sensor outputs. Appendix C defines the update and normalization procedures for the quaternions. The update portion is in fact a propagation of the quaternion vector as it propagates in time. In order to characterize how the quaternion changes in time, an equation is created which explicitly defines the time dependency of the quaternion (or its derivative), and this equation is referred to as a differential equation. The propagation is then obtained by calculating the solution to the differential equation. In order to solve the differential equation we need to integrate 150 the equation which then removes the time dependence of the derivative of the quaternion, and allows us to obtain the value of the quaternion at any time. In order to maintain complete stability of the calculation, one of the properties of the quaternion that must be maintained is that the magnitude (the square root of the sum of the squares) of the quaternion vector must always equal one (1). This is achieved by normalizing 37 the quaternions. The variables in Appendix C describe both the updating and normalization process. The quaternion represented by a,b,c and d, and the angular rate vector (calibrated gyro measurements) is represented by $\omega c[3]$. The four temporary terms a4,b4,c4 and d4 represent the derivative of the quaternion, and the four equations for these terms represent the differential equation for the quaternion vector. Notice the dependence of the derivative (time rate of change) of the quaternion on the angular rate terms which really represent the rate of change of the rotation about each axis X,Y and Z. Also notice that the corrective angular rates $\omega cx$, $\omega cy$ and $\omega cz$ are also present in the differential equation. This is in effect how the angular rate terms obtained from the gyros are corrected. The update quaternion section and the four equations using the quaternion terms define the integration of the differential equation process. The time dependency on the derivative of the quaternion is solved for, and therefore the quaternion vector itself is calculated. The final section then normalizes the calculated quaternion thereby assuring that the magnitude of the quaternion will always be one (1).

Figure 4A:
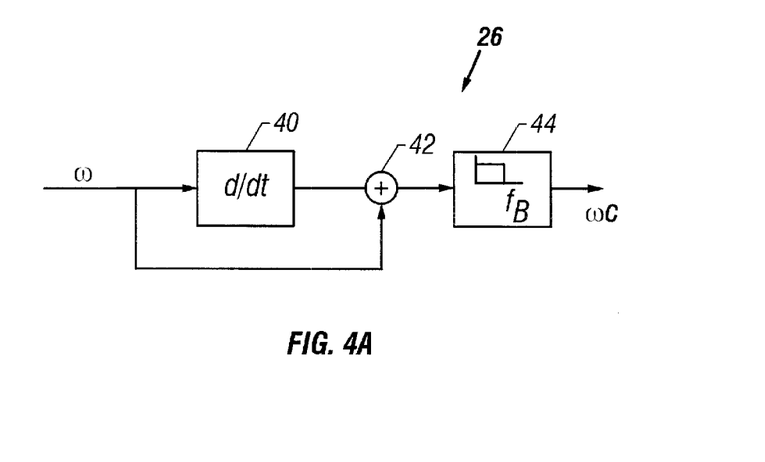
FIG. 4A is a schematic diagram of one embodiment of the present invention for enhancing bandwidth.
Figure 4B:
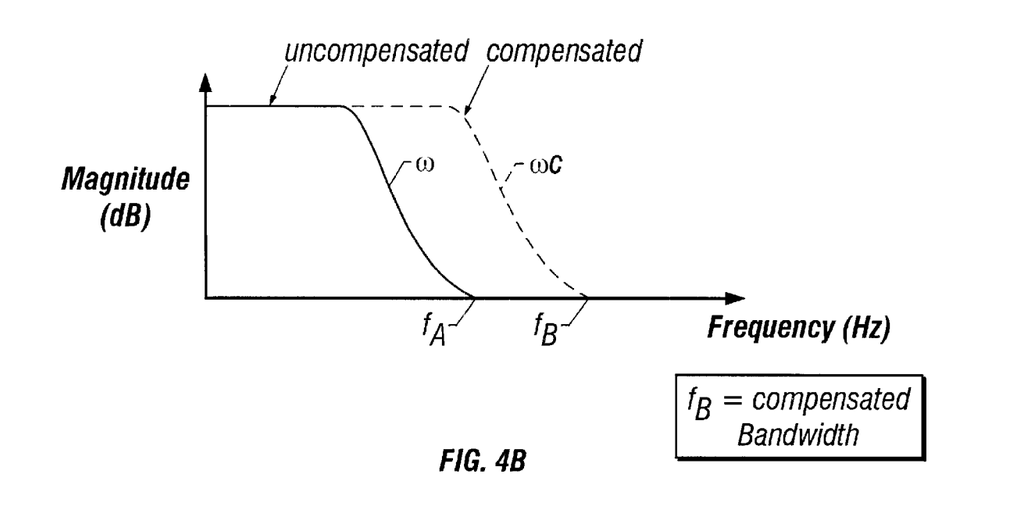
FIG. 4B is a graph showing bandwidth compensation according to the present invention.

Reference is now made to FIGS. 4A and 4B in order to discuss a further compensation process that may be provided by the system in accordance with the present invention. The bandwidth of conventional sensors is commonly too narrow (e.g. about 10 $H_z$) for many applications requiring quick stabilization to produce accurate output data rapidly. In such applications, a frequency-compensating network 26, as shown in FIG. 4A in either digital or analog form, may be introduced into the circuit to operate on sensor output signals, and may include a differentiator 40 and summing junction 42 followed by a low pass filter 44. Specifically, the angular rate signal, ω, is applied to differentiator 40 and to summing network 42 which is also connected to receive the output of the differentiator 40. A low-pass filter 44 having a bandwidth to about 100 $H_z$ receives the combined angular rate signal, ω, and the differentiated angular rate signal at the output of summing network 42 to provide the compensated angular rate signal, ωc, having higher frequency components and wider bandwidth, as shown in FIG. 4b, than the initial angular rate signal.

Thus, the frequency compensation stage performs frequency compensation to the gyros and accelerometers which can provide enhanced dynamic response of, reduce the noise in, and reduce the sensitivity to vibration of the quaternion update. In other words, performing frequency compensation is performed to the gyro sensor data which expand the operational bandwidth of the gyros to provide updates to the quaternion under dynamic conditions which the gyro sensor alone would not be able to track, or which compress (filter) the gyro and accelerometer bandwidth to reduce noise and to reduce vibration sensitivity in the quaternion calculation.

As a further option, the user may turn off the low-pass filter 44 so that the above filter compensation technique is not performed. Therefore, the apparatus and processes according to the present invention provide a low-cost sensor assembly for camera and other platform stabilization systems, and for other dynamic positioning and guidance control systems in automotive, marine, and aeronautical applications that require convenient gravity reference.

---

Appendix A - Sensor Compensation

Raw sensor inputs ab[3] Accelerations uncorrected (ab[1] = x, ab[2] = y, abl[3] = z
ωb[3] Rate Sensor uncorrected (ωb[1] = x, ωb[2] = y, ωbl[3] = z)
Corrected Sensor Outputs ac[3] Accelerations uncorrected
ωc[3] Rate Sensor uncorrected
Calibration coefficients ba[3] accelerometer bias
sa[3] accel scale error
L2[3] accel non-linearity
bω[3] rate bias
sω[3] rate scale error
ma[12] misalignment table
Accelerometer Channel Error al[1] ((L2[1]*ab[1]sa[1]*ab[1])+ba[1]ab[1]
al[2] ((L2[2]*ab[2]sa[2]*ab[2])+ba[2]ab[2]
al[3] ((L2[3]*ab[3]sa[3]*ab[3])+ba[3]ab[3]
Gyro Channel Error ωl[1] = (sω[1]*ωb[1]+bω[1]+ωb[1]
ωl[2] = (sω[2]*ωb[2]+bω[2]+ωb[2]
ωl[3] = (sω[3]*ωb[3]+bω[3]+ωb[3]
Accelerometer Compensation for Misalignment ac[1] = ma[1]*al[2]+ma[2]*al[3]+[1];
ac[2] = ma[4]*al[1]+ma[3]*al[3]*[2];
ac[3] = ma[5]*al[1]+ma[6]*al[3]+[3];
Gyro compensation for misalignment ωc[1] = ma[7]*ωl[2] + ma[8]* ωl[3] + ωl[1]
ωc[2] = ma[10]*ωl[1] + ma[9]* ωl[3] + ωl[2]
ωc[3] = ma[11]*ωl[1] + ma[12]* ωl[2] + ωl[3]

---

Appendix B Factory Calibration alev[3] = level frame acceleration/tilt of platform
ac[3] = compensated body frame acceleration readings see Step 2
dc[3][3] = direction cosines matrix
alev[1] = dc[1][1] * ac[1] + dc[1][2] * ac[2] + dc[1][3]*ac[3];
alev[2] = dc[2][1] * ac[1] + dc[2][2] * ac[2] + dc[2][3]*ac[3];
alev[3] = dc[3][1] * ac[1] + dc[3][2] * ac[2] + dc[3][3]*ac[3];

---

Appendix C - Update Quaternion and Normalize Quaternion

DT = Time change in seconds from last update divided by 2
DQ = Normalization coefficient
a4,b4,c4,d4 = temporary quaternion
a,b,c,d = quaternion representation of attitude
ωc[3] = angular rate sampled over DT interval by A/D converter
(1,2,3 = X,Y,Z respectively)
ωcx = corrective rate signals x generated in Appendix A, para. 7
ωcy = corrective rate signals y generated in Appendix A, para. 7
ωcz = corrective rate signal z (azimuth)
/*compute temporary
quaternion as a function of sensed rates and previous quaternion */
a4 = DT* ((ωc[3]+ωcz)*b - (ωc[2]+ωcy)*c + (-1*ωc[1]+ωcx)*d);
b4 = DT* ((-1*ωc[3]-ωcz)*a + ωc[1]+ωcx)*c + (ωcy - ωc[2]*d);
c4 = DT* ((ωc[2]+ ωcy)*a - (ωc[1]+ωcx)*b + (-1*ωc[3]+ωcz)*d);
d4 = DT* ((ωc[1]-ωcx)*a + (ωc[2]-ωcy)*b + (ωc[3]-ωcz)*c);
/*update quaternion*/
a += a4;
b += b4;
c += c4;
d += d4;
/*normalize quaternion*/
DQ =1 - 05*(a*a + b*b + c*c +d*d −1);
a *=DQ;
b *=DQ;
c *=DQ;
d *=DQ;

---

Appendix D - Convert Quaternion to Direction Cosines Matrix d1,d2,d3,c11,c12,c13,c14,c22,c23,c24,c33,c34   Temporary storage
dc[3][3]            3x3 direction cosines matrix
/*compute temporary storage*/
d1 = a + a;
d2 = b + b;
d3 = c + c;
c11 = d1 * a;
c12 = d1 * b;
c13 = d1 * c;
c14 = d1 * d;
c22 = d2 * b;
c23 = d2 * c;
c24 = d2 * d;
c33 = d3 * c;
c34 = d3 * d;
/*update direction cosines*/
dc[1][1] = 1 − c22 − c33;
dc[2][2] = 1 − c11 − c33;
dc[3][3] = 1 − c11 − c22;
dc[2][1] = c12 − c34;
dc[1][3] = c13 − c24;
dc[3][2] = c23 − c14;
dc[1][2] = c12 + c34;
dc[3][1] = c13 + c24;
dc[2][3] = c23 + c14;

| Appendix E - Generate Corrective Rates |
|---|
| Option 1: Proportional Gain<br>ωcx = -KG * alev [2];<br>ωcy = KG * alev [1];<br>Option 2: Non-linear Gain<br>if(alev[2] > 0.0)<br>    ωcx = -1*UG<br>else<br>    ωcx = UG<br>if(alex[1] > 0.0)<br>    ωcy = UG;<br>else<br>    ωcy = -1*UG |

| Appendix F - Heading/Azimuth Corrective Rate |
|---|
| ωcz: azimuth corrective rates<br>ct: cosine of true heading<br>st: sine of true heading<br>ωcz = KG * (ct*dc[2][1] - st*dc[1][1]) |

| Appendix G - Extract Euler Angle for Direction Cosines |
|---|
| Roll,Pitch,Yaw - final outputs in Euler Angle format<br>Roll = atan (dc[3][2]/dc[3][3])<br>Pitch = asin (dc[3][1])<br>Heading = atan (dc[3][2], dc[1][1]) |

What is claimed is:

1. A method for determining an attitude of an accelerating object exclusively from acceleration and angular rate, comprising:
   determining an angular rate of the object to obtain a quarternion representation of attitude;
   converting the quarternion into a direction cosine matrix;
   determining a level frame acceleration value of the object based upon the direction cosine matrix and an acceleration of the object;
   generating a corrective rate signal based upon the level frame acceleration value; and
   updating the quarternion representation based upon the determined angular rate of the object and the corrective rate signal, and converting the updated quarternion into a direction cosine matrix to obtain the attitude of the object.

2. The method of claim 1 further comprising:
   extracting Euler Angles from the direction cosine matrix to represent the attitude of the object.

3. The method of claim 1 wherein the corrective signal includes a correction component to correct for a heading deviation of the object.

4. The method of claim 1 further comprising:
   performing temperature corrections to the gyros and accelerometers which provide temperature compensated gyro data which directly updates the quarternion, and temperature compensated accelerometer data which provides accurate rate corrections to correct the quarternion update.

5. The method of claim 1 further comprising:
   performing frequency compensation to the gyro sensor data which expand the operational bandwidth of the gyros to provide updates to the quarternion under dynamic conditions which the gyro sensor alone would not be able to track, or which compress (filter) the gyro and accelerometer bandwidth to reduce noise and to reduce vibration sensitivity in the quarternion calculation.

6. The method of claim 1 wherein the gain of the correction signal is adjustable.

7. The method of claim 1 wherein calibrated data is obtained by applying compensation parameters to the raw sensor data.

8. The method of claim 1 wherein an automated calibration procedure provides the compensation parameters used to compensate the raw sensor data.

9. The method of claim 1 whereby the quarternion differential equation is defined to be dependent on the angular rates measured by the gyros, and on the corrective rates determined from the accelerometer gravity reference algorithm, solved through integration, and then the quarternion is normalized.

10. A self-contained system capable of determining an attitude of an accelerating object exclusively from acceleration and angular rate, the system, comprising:
    an acceleration sensor aligned with each of a plurality of orthogonally-oriented axes of rotation of the object for providing an acceleration value;
    an angular rate sensor aligned with each of the plurality of orthogonally-oriented axes of rotation of the object for providing an angular rate value;
    a processor for receiving the acceleration value from the acceleration sensor and the angular rate value from the angular rate sensor, and for executing a computer program that performs the steps of:
    establishing a quarternion representation of attitude based on the angular rate value;
    converting the quarternion into a direction cosine matrix;
    determining a level frame acceleration value of the object based upon the direction cosine matrix and the acceleration of the object;
    generating a corrective rate signal based upon the level frame acceleration; and
    updating the quarternion representation based upon the angular rate of the object and the corrective rate signal to obtain the attitude of the object.

11. The system of claim 10 further comprising:
    a temperature sensor, coupled to the processor, for providing temperature data used to compensate the gyros and accelerometers which provide the update and correction to the update of the quarternion.

12. The system of claim 10 further comprising:
    a magnetic sensor, coupled to the processor, for providing heading data used to update the quarternion.

13. The system of claim 10 further comprising:
    a frequency compensation stage for performing frequency compensation to the gyros and accelerometers which can provide enhanced dynamic response of, reduce the noise in, and reduce the sensitivity to vibration of the quarternion update.

14. The method of claim 1 further comprising:
    using a local level-plane predefined maneuvering Kalman Filter algorithm to automatically estimate and provide gyro and accelerometer calibration coefficients.

15. A self-contained system for determining an attitude of an accelerating object exclusively from acceleration and angular rate, the system comprising:

a plurality of acceleration sensors configured to determine an acceleration rate of the accelerating object, each acceleration sensor being aligned with one of a plurality of orthogonally-oriented axes of rotation of the object;

a plurality of angular rate sensors configured to determine the angular rate of the accelerating object, each angular rate sensor being aligned with one of the plurality of orthogonally-oriented axes of rotation of the object;

wherein an initial calibration is performed for the plurality of acceleration sensors and angular rate sensors disposed about the orthogonally-oriented axes of rotation for producing calibration data;

a processor coupled to the acceleration sensors and the angular rate sensors and including a memory for storing calibration data, the processor configured to determine the attitude of the accelerating object by:

converting in one processing cycle the acceleration rate and the angular rate in time-sequenced share mode;

using the stored calibration data to calibrate the acceleration rate and angular rate of the accelerating object based upon temperature and misalignment of the plurality of sensors on the object;

computing a quaternion representation of attitude of the accelerating object based upon the angular rate and a corrective angular rate of the accelerating object, and normalizing the quarternion representation;

converting the quarternion representation into a direction cosine matrix;

multiplying the direction cosine matrix with a compensated acceleration rate to obtain a true acceleration of the object without tilt;

generating a corrective rate signal based upon the true acceleration of the object without tilt; and extracting euler angles from the direction cosine matrix for producing a representative output.

16. The system of claim 15 further comprising:

a plurality of magnetic sensors coupled to the processor and configured to provide a correction rate for yaw axis acceleration.

17. A method of determining an attitude of an accelerating object exclusively from acceleration and angular rate, comprising:

performing an initial calibration of a plurality of sensors configured to sense the acceleration rate and the angular rate of an accelerating object;

sensing the acceleration rate and the angular rate of the accelerating object by use of the plurality of sensors;

converting in one processing cycle the acceleration rate and the angular rate in time-sequenced share mode;

using stored calibration data to calibrate the acceleration rate and angular rate of the accelerating object based upon temperature and misalignment of the plurality of sensors on the object;

computing a quarternion representation of attitude of the accelerating object based upon the angular rate and a corrective angular rate of the accelerating object, and normalizing the quarternion representation;

converting the quarternion representation into a direction cosine matrix;

multiplying the direction cosine matrix with a compensated acceleration rate to obtain a true acceleration of the object without tilt;

generating a corrective rate signal based upon the true acceleration of the object without tilt; and extracting euler angles from the direction cosine matrix for producing a representative output.

* * * * *